United States Patent [19]

Jensen et al.

[11] Patent Number: 5,448,907
[45] Date of Patent: Sep. 12, 1995

[54] APPARATUS AND METHOD FOR DETECTING FLUID FLOW

[75] Inventors: Richard A. Jensen, Staten Island; Anthony M. Agnone, Bayville, both of N.Y.

[73] Assignee: Long Island Lighting Company, Hicksville, N.Y.

[21] Appl. No.: 164,317

[22] Filed: Dec. 9, 1993

[51] Int. Cl.⁶ .............................................. G01M 3/28
[52] U.S. Cl. ............................................ 73/38; 73/40; 73/49.5
[58] Field of Search .................... 73/38, 40, 49.5, 49.8

[56] References Cited

U.S. PATENT DOCUMENTS

| | | | |
|---|---|---|---|
| 2,255,921 | 9/1941 | Fear | 73/51 |
| 3,034,339 | 5/1962 | Gawlik | 73/49.5 |
| 3,163,854 | 12/1964 | Englebart | 340/174 |
| 3,296,601 | 1/1967 | Fritz | 340/174 |
| 3,371,521 | 3/1968 | Hauk | 73/49.5 |
| 3,375,505 | 3/1968 | Englebart | 340/174 |
| 3,877,293 | 4/1975 | McKeage | 73/49.5 |
| 3,975,945 | 8/1976 | Hauk et al. | 73/49.5 |
| 4,185,492 | 1/1980 | Hauk et al. | 73/46 |
| 4,194,389 | 3/1980 | Laging | 73/49.5 |
| 4,416,146 | 11/1983 | Ambrose | 73/49.5 |

FOREIGN PATENT DOCUMENTS 1258895  1/1968  Germany .

OTHER PUBLICATIONS

Mruk, S. "Pipe", Encyclopedia of Polymer Science and Engineering, vol. 11, John Wiley & Sons (1988), pp. 226–248.
Perry's Chemical Engineers' Handbook, Fourth Edition, McGraw Hill Book Company (1963), pp. 6–45 through 6–47.
Kirk–Othmer Encyclopedia of Chemical Technology, Third Edition (1981), vol. 16, pp. 53–55 and 70.
Kirk–Othmer Encyclopedia of Chemical Technology, Third Edition (1983), vol. 23, pp. 654–656 and 671–672.

Primary Examiner—Hezron E. Williams
Assistant Examiner—J. David Wiggins
Attorney, Agent, or Firm—Dilworth & Barrese

[57] ABSTRACT

Apparatus for detecting fluid flow across an article is provided in which the article is received in a sealed chamber and protrudes into ambient surroundings from the chamber that is sealed. Any fluid flow through the article between the ambient surroundings and the sealed chamber can be detected after a pressure differential across the article is generated.

21 Claims, 11 Drawing Sheets

FIG. 11 PRESSURE HISTORY IN CAVITY OF LEAK TESTER - PROPERLY FUSED PIPE

FIG. 14 PRESSURE HISTORY IN CAVITY FOR COLD AND HOT AMBIENT CONDITIONS

APPARATUS AND METHOD FOR DETECTING FLUID FLOW

BACKGROUND OF THE INVENTION

1. Field of the Invention

The present invention relates to an apparatus and method for detecting fluid flow through a solid article. More particularly the present invention is directed to an apparatus and method for determining the presence of fissures or leaks in piping. The present invention is particularly well suited for nondestructive testing of pipe formed from synthetic plastic material.

2. Discussion of the Prior

Synthetic plastic piping has been gradually replacing metallic piping as a conduit for a variety of pressurized and nonpressurized fluids. For example, plastic piping is used for plumbing in general, such as for delivery of drinking water or for sewer lines, or for transmitting fuel. In this regard, certain plastic piping is increasingly being used in the distribution of natural gas. Plastic piping is resistant to galvanic chemical attack which causes corrosion of metallic piping, e.g., corrosive attack by water, soil, mild acids, bases and other electrolytes. The use of plastic piping in the distribution of natural gas provides improved performance primarily as a result of the occurrence of fewer leaks. Additionally, ease of handling, durability and economy are other advantages provided by plastic piping.

Plastic piping sections are molded by variously known techniques such as extrusion or injection molding and are then joined to one another in a variety of ways. For example, plastic pipe used for buried water lines can be manufactured with bell and spigot connections wherein the bell including its gasket cavity is formed during molding as an integral part of the pipe. Other plastic pipe sections can be complementarily molded for threading to one another. Butt fusion of plastic piping sections which involves heating the ends of the sections and forcing the heated ends together whereby a beaded joint is formed upon cooling, has been found efficient and practical for joining most plastic pipe sections. Various types of plastic piping and methods for preparation are described, e.g., by Mruk, S. "Pipe", *Encyclopedia of Polymer Science and Engineering, Volume* 11, John Wiley & Sons, New York (1988), pages 226–248.

The most prevalent location for occurrence of leaks in a piping system, plastic or otherwise, is at the joints between respective pipe sections. Adequacy of welds and bolted joints in piping systems have been examined by pressurizing the interior of the pipe and measuring any leakage through the weld or joint, i.e., fluid flow from the pressurized pipe, after the pipe has been installed. However, considerable energy consumption has been involved in pressure testing of pipe in this manner. Additionally, it is difficult to remove pipe once it has been installed as part of a fluid distribution system. Accordingly, other methods for leak testing of pipe have been developed. For example, metallic pipe sections can be examined for fissures at the joints by radiography (X-rays) or ultrasound techniques prior to incorporation into a fluid delivery system. However, plastic piping is not sensitive to radiographic analysis, while ultrasound analysis remains difficult and cumbersome to be applied by personnel installing the fluid delivery system. Accordingly, there is a need to develop a technique whereby sections of piping can be easily examined for the presence of potential leaks prior to or during installation as part of a fluid delivery system.

SUMMARY OF THE INVENTION

Accordingly, it is an object of the present invention to provide an apparatus and method to detect fluid flow through an article such as a pipe which would be indicative of a leak within the article.

Another object of the present invention is to provide an apparatus and method for detecting potential leaks in an article such as a pipe whereby the article can be examined in an easy, reliable manner prior to incorporation into a fluid delivery system.

It is a further object of the present invention to provide an apparatus and method for reliably detecting potential leaks in an article formed of plastic material such as a plastic pipe.

These and other objects are attained by the present invention which is directed to apparatus for detecting fluid flow across an article, comprising means defining a chamber for receiving the article therein, and means for sealing an interior of the chamber from ambient surroundings such that at least a portion of the article protrudes into the ambient surroundings, whereby fluid flow through the article between the ambient surroundings and the chamber can be detected. The present invention is also directed to a method for detecting fluid flow across an article and a system for detecting a leak or fissure in a pipe.

The present invention allows an article formed of plastic material to be reliably examined for potential leaks which was not possible with previously-used techniques for testing metallic pipes. In particular, plastic pipe can be reliably tested without need to pressurize the pipe, so that the pipe can be tested prior to installation, during the installation process or even after installation if the pipe is exposed in the system. The present invention also allows for testing specific sections of the piping, such as joints or welds. Such pipe can be easily tested just prior to installation as part of a fluid delivery system so that occurrence of leaks in the activated fluid delivery system, e.g., a gas distribution system, can be minimized or avoided entirely.

BRIEF DESCRIPTION OF THE DRAWINGS

The present invention will be described in greater detail below with reference to the accompanying drawings, in which.

DESCRIPTION OF THE PREFERRED EMBODIMENTS

Figure 1:
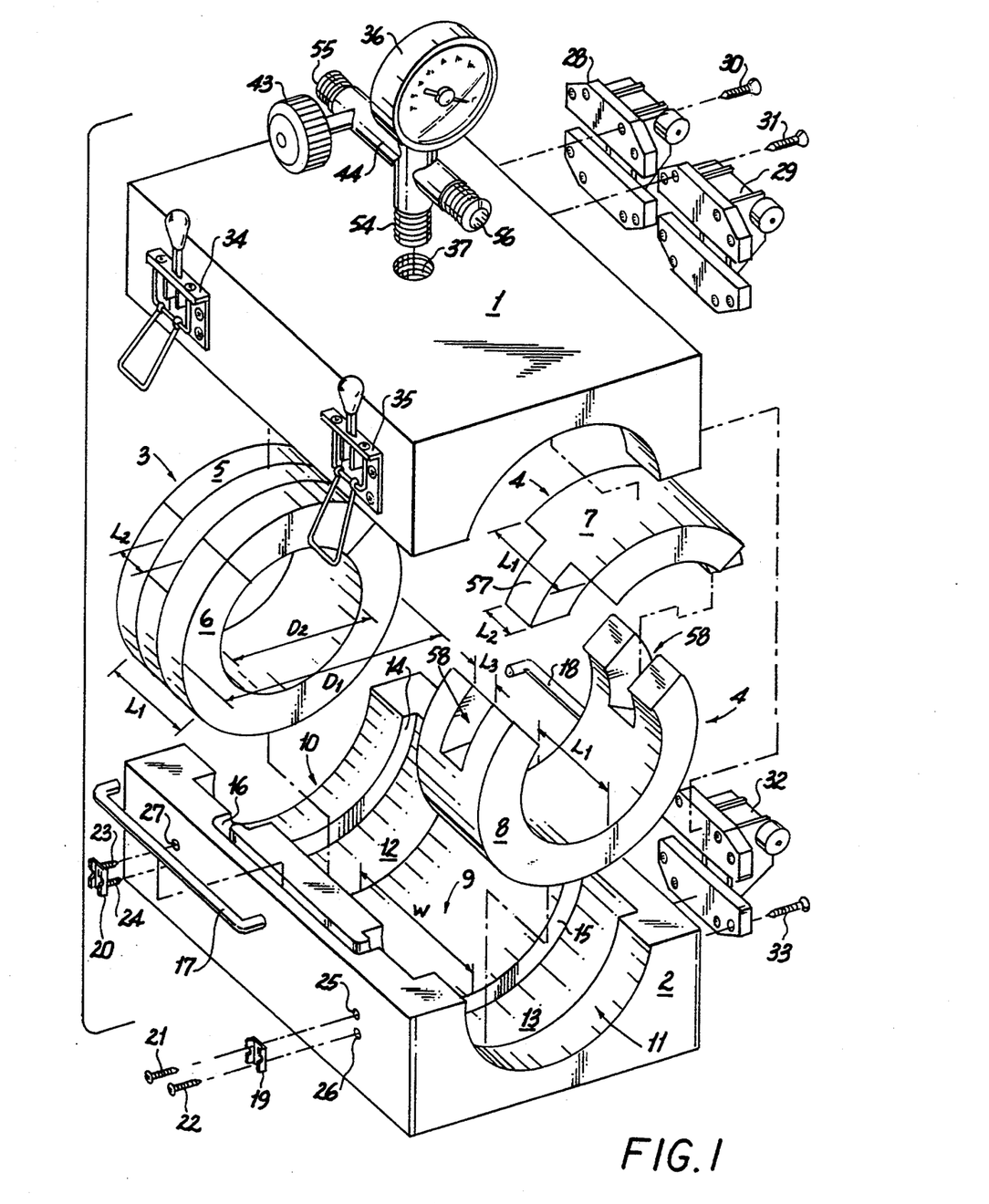
FIG. 1 is an exploded view of apparatus for use in accordance with the present invention.

Referring to the drawings, the apparatus of the present invention is formed from two separate members 1 and 2 which, when coupled and closed together, define a chamber 9 therebetween. The exact dimensions of chamber 9 are not critical so long as overall volume within this chamber 9 is provided as described infra to receive an article of appropriate size and shape for testing. The chamber defining members 1 arid 2 are also formed to provide respective seats at opposite sides of the chamber 9 for receiving sealing means described infra. Seats 12 and 13 and a lower interior part of chamber 9 in member 2 are shown in FIG. 1, it being understood that complementary features are formed in upper member 1 so that when members 1 and 2 are brought together and closed, an internal chamber 9 together with internal seats for lateral seals 3 and 4 are defined by members 1 and 2. Additionally, seats are formed in at least one of members 1 and 2 to receive longitudinal sealing means along chamber 9. One such seat 16 is illustrated in FIG. 1 for receiving longitudinal seal 17 in member 2 while longitudinal seal 18 is received in a seat along the opposite side of chamber 9 and which is hidden in the view shown in FIG. 1.

Figure 3:
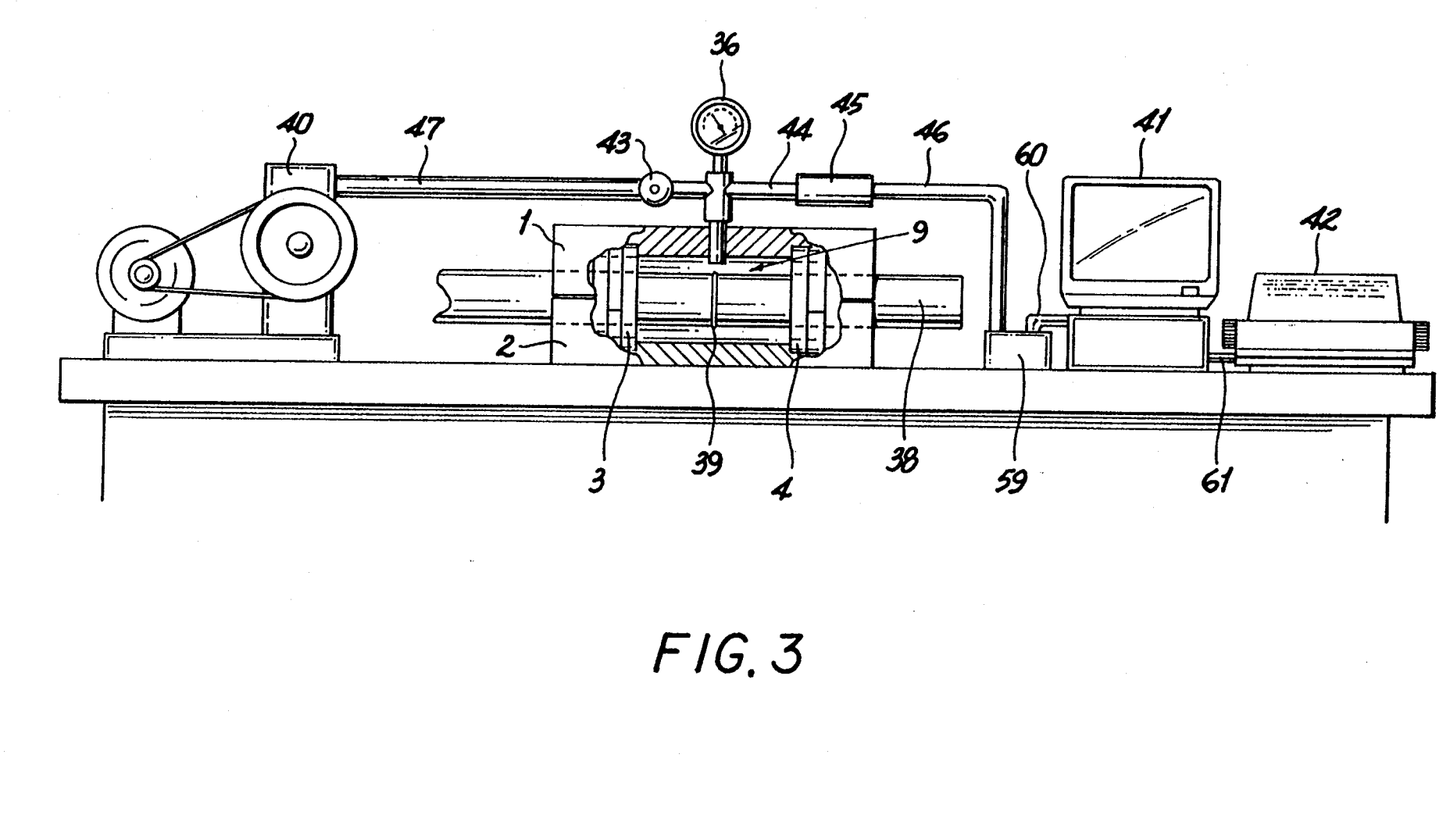
FIG. 3 is a front elevational view partially in section of the apparatus of FIG. 2 having the article received therein and being connected to an analytical testing system.

The members 1 and 2 are also formed so that opposite ends 10 and 11 of chamber 9 are open to ambient surroundings after members 1 and 2 are closed together. This allows an article such as a pipe 38 situated within chamber 9 to protrude out through opposite ends 10 and 11 and into the ambient surroundings as shown in FIG. 3 after members 1 and 2 are closed. Members 1 and 2 are formed of sufficiently hard material so that they can be machined to provide proper dimensions for chamber 9, lateral seats 12 and 13, lateral open ends 10 and 11 and longitudinal seats 16. In this regard, members 1 and 2 can be formed from Lucite, a poly(methylmethacrylate) clear plastic available from E. I. Du Pont & Co., Wilmington, Del. Use of Lucite allows testing personnel to see through members 1 and 2 and into chamber 9 during testing. However, other sufficiently hard material can be used to form members 1 and 2. For example, solid aluminum 6061T6 available from Reynolds Metal Company, Richmond, Va., or other suitable aluminum products from ALCOA Sheet and Plate Division, Bettendorf, Iowa, can be machined into members 1 and 2 with proper dimensions for chamber 9, lateral seal seats 12 and 13, etc. Alternatively, members 1 and 2 can be formed by casting into molds provided with proper dimensions for all these features described supra. Suitable material which can be cast into members 1 and 2 in this regard include aluminum, magnesium and Lexan (a polycarbonate plastic available from General Electric, Pittsfield, Mass.).

Figure 4:
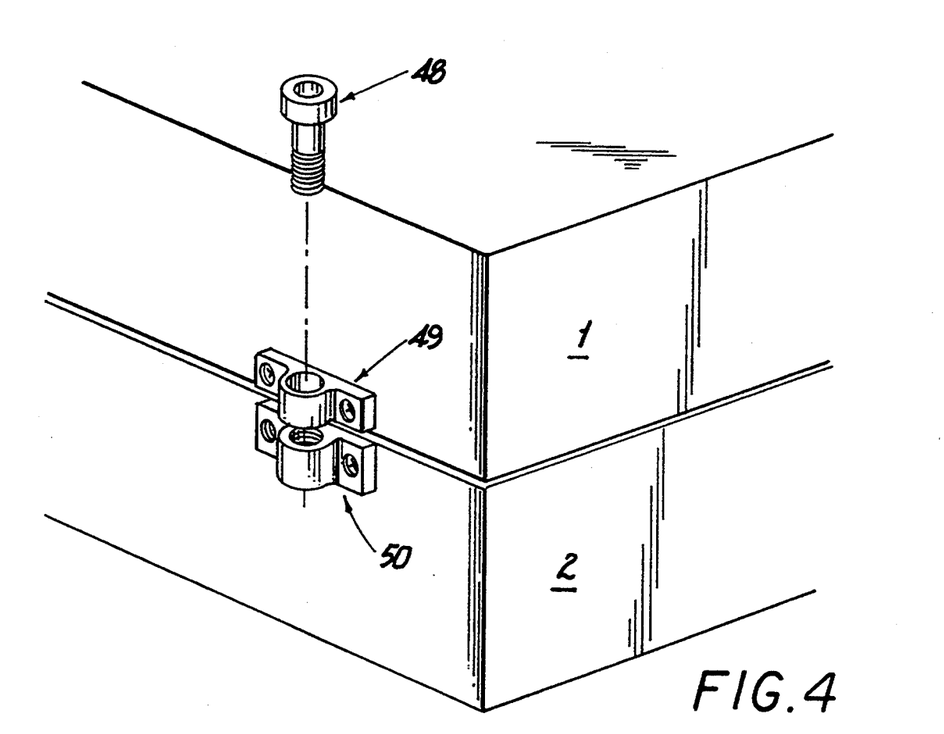
FIG. 4 is a partial perspective view illustrating alternative means for coupling parts of the apparatus of FIGS. 1–3 together.
Figure 9:
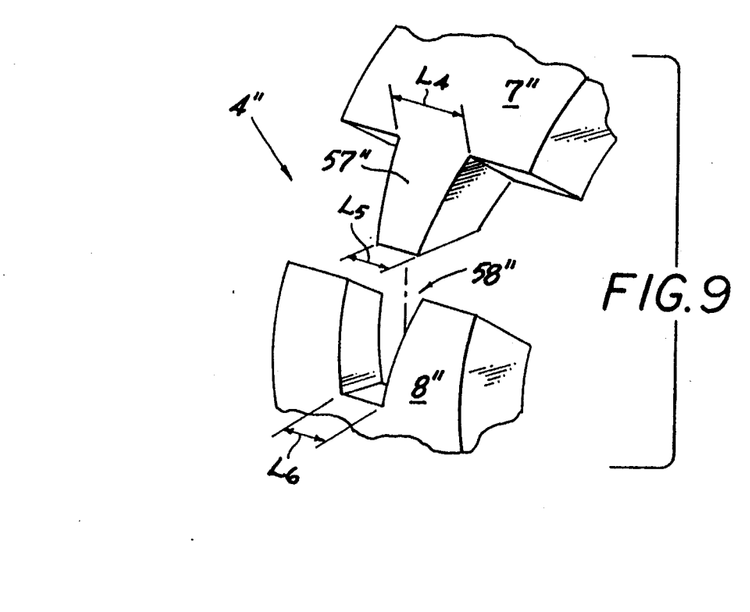
FIG. 9 is a partial perspective view illustrating modification of the sealing means shown in FIG. 1 for use in conjunction with the apparatus of the present invention.

Reference numeral 14 denotes a wall of seat 12 adjacent open end 10 while reference numeral 15 denotes a wall of seat 13 adjacent chamber 9 in FIG. 9. Respective walls are defined on opposite sides of seats 12 and 13 and are hidden in the view of FIG. 1. Longitudinal distance along chamber 9 in the direction of ends 10 and 11 is denoted by reference character W in FIG. 1. Members 1 and 2 are preferably pivotally coupled together with hinges such as three offset hinges 28, 29 and 32 as shown which are affixed to respective members 1 and 2 with suitable fastening means such as, for example, fastening screws 30, 31, 32, etc., several of which are shown in FIG. 1. Latching means are also provided to retain members 1 and 2 in locked position once these members have been pivotally closed about an article such as pipe 38. Such latching means can take the form of two latching clamps 34 and 35 mounted upon member 1 and corresponding latching hooks 20 and 19 mounted upon the member 2 with fastening means such as screws 23, 24, 21, 22 extending into respective openings 27, 25, 26 etc. as shown in FIG. 1. It is also contemplated that the latching means can be provided about the perimeter of the members 1 and 2, in effect eliminating the need for the hinges. The hinges, however, are preferred to provide a means for ensuring that members 1 and 2 meet in an abutting manner to seal chamber 9, as will be discussed below. FIG. 4 illustrates fastening means comprising two threaded bores 49 and 50 mounted by respective brackets upon members 1 and 2. A securing bolt 48 is inserted into bore 49 in the direction of the dash-dot line and threaded through both bores 49 and 50 to fasten members 1 and 2 together.

Figure 7:
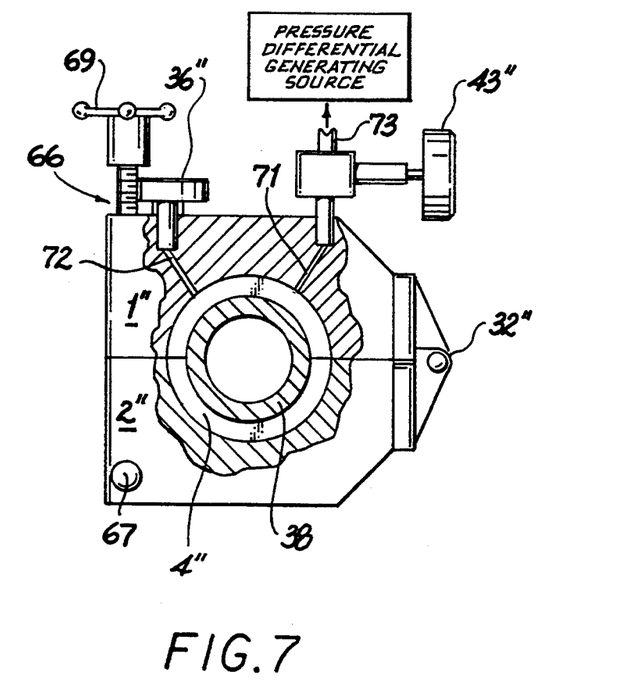
FIG. 7 is a right side elevational view, partially in section, of an alternative embodiment of the apparatus of the present invention.
Figure 8:
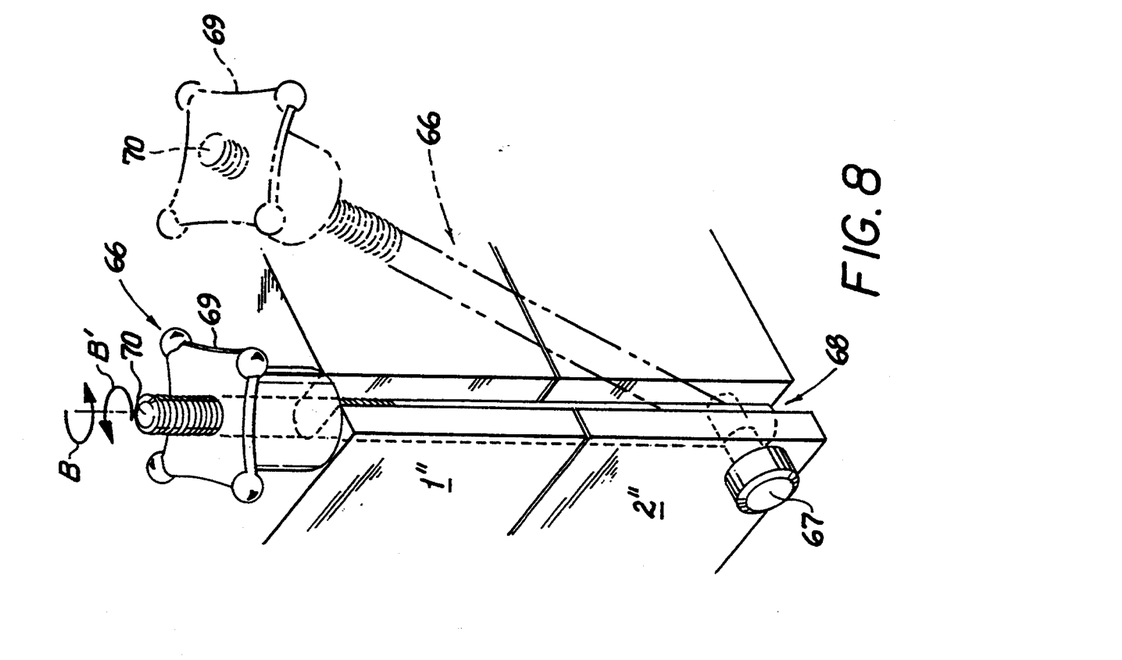
FIG. 8 is a partial perspective view illustrating alternative means for coupling parts of the apparatus of FIGS. 1–3 together.

Alternative fastening means for the invention apparatus are shown in FIGS. 7 and 8. More particularly, an eyebolt 66 is shown pivotably mounted about a shaft 67 and arranged to seat in a recess 68 appropriately provided in members 1" and 2". When members 1" and 2" have been appropriately closed about an article such as a pipe 38, the eyebolt 66 is pivoted from the phantom position to the upright position in recess 68 shown in FIG. 8. Next, clamp 69 which is threadingly mounted on an end 70 of eyebolt 66, is screwed in the direction of arrows B or B' to lock eyebolt 68 into the recess 68 as shown in FIG. 8. In this regard, the tipper end 70 of eyebolt 66 and clamp 69 can be correspondingly threaded so that clamp 69 is tightened upon eyebolt 66 by being turned or screwed in either a clockwise B or counterclockwise B' direction. Generally, two such respective eyebolts, pivotally-mounted shafts, threaded clamps and respective receiving recesses are provided in the invention apparatus to secure members 1" and 2" together.

Member 1 is provided with at least one port 37 which extends into chamber 9. Port 37 can be bored into member 1 to threadingly receive one leg 54 of a T-joint 44 as illustrated in FIG. 1. The T-joint can be additionally provided with a shut-off valve along another leg 55 thereof, the knob 43 of which is illustrated in FIG. 1, and a pressure gauge such as a vacuum gauge, dial 36 of which is also illustrated in FIG. 1. T-joint 44 can be coupled to various pressure differential generating means and measuring means through legs 55 and 56 as described infra with respect to FIG. 3. In the embodiment illustrated in FIG. 1, means for generating a pressure differential across an article 38 mounted in the closed and sealed chamber 9 and means for detecting fluid flow across the article 38, i.e. pressure measuring means, are both mounted to communicate with the chamber 9 interior through a single port 37. However other ways of mounting of these respective pressure generating means and measuring means are also contemplated with the purview of the present invention. For example, additional ports can be bored into one of the members, e.g., also into member 1 adjacent port 37 and as described further with respect to FIG. 7 infra. In that situation, pressure differential generating means would be mounted to communicate with the chamber 9 interior through one of these ports while means for determining fluid flow would be mounted to communicate with the chamber 9 interior through the other of these ports.

Figure 2:
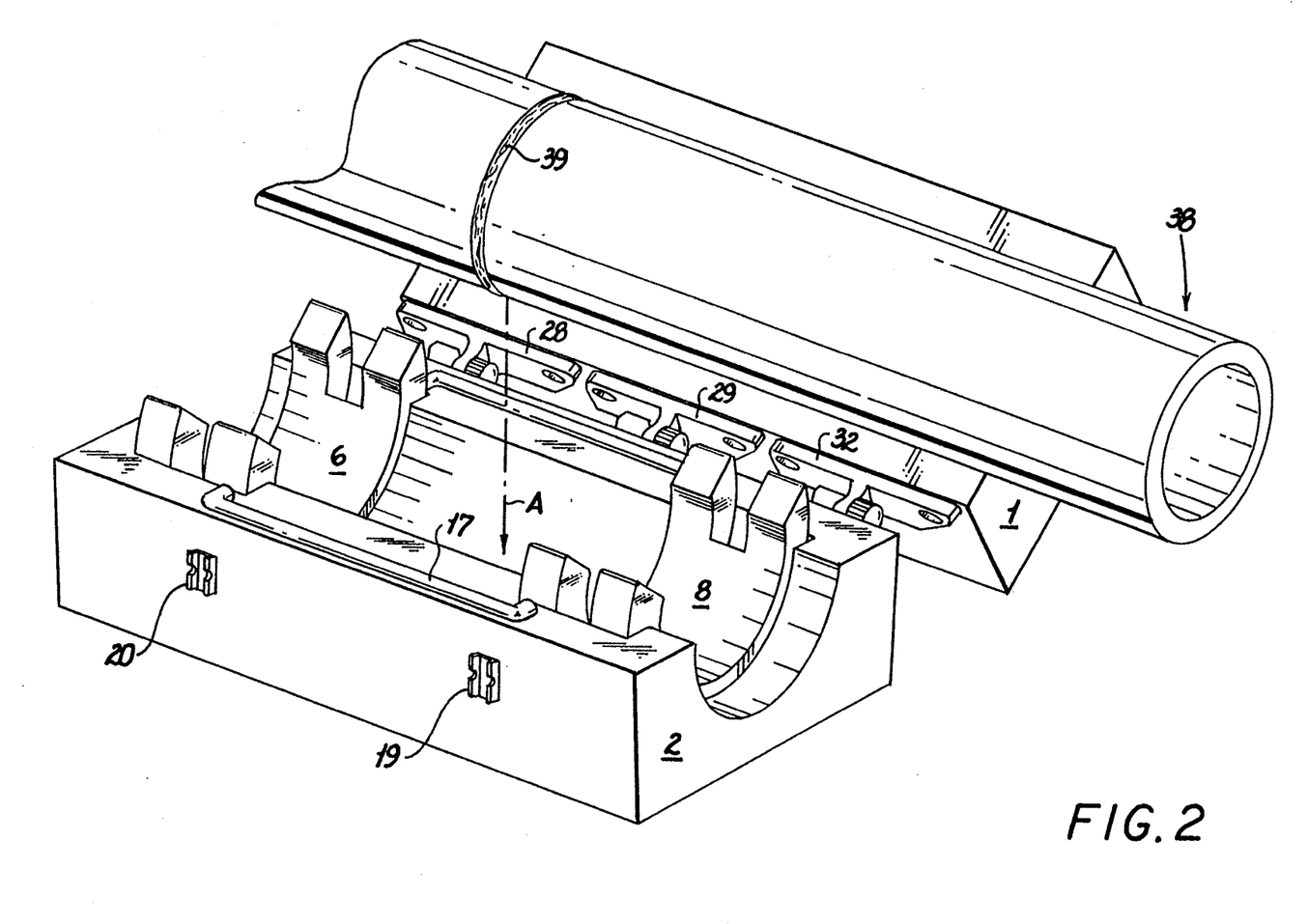
FIG. 2 is a schematic perspective view illustrating the assembled apparatus of FIG. 1 and insertion of an article to be tested thereinto.

Lateral seals 3 and 4 are designed to snugly fit about an article such as the pipe 38 placed within chamber 9 so that the interior of chamber 9 is reliably sealed from ambient surroundings when members 1 and 2 are pivotally closed and fastened together. At the same time, pipe 38 extends through the seals 3 and 4 and into the ambient surroundings as shown in FIG. 3. In this manner, a pressure differential can be generated across pipe 38 with respect to the ambient surroundings with pressure being monitored to detect any leaks that might occur in the pipe 38, notably at a joint 39 formed between the two pipe sections as shown in FIG. 2. In this regard, seals 3 and 4 are respectively formed by seal members 5, 6, 7 and 8 which are structured and arranged to interdigitate with one another and thereby formed a secure circumferential seal about the pipe 38.

More explicitly, in FIG. 1 seal 4 is illustrated with complementary male 7 and female 8 members, the male member 7 having an outer longitudinal distance $L_1$ and an inwardly stepped extension 57 denoted by an inner longitudinal distance $L_2$. By the same token, female seal member 8 is provided with an inner recess 58 provided with a longitudinal distance $L_3$ dimensioned to snugly receive extension 57 of male member 7 when the male and female seal members 7 and 8 are brought together. The outer longitudinal distance of female member 8 is also denoted by $L_1$ so that when seal members 7 and 8 are brought together, a continuous circumferential seal is formed as illustrated by seal 3 in FIG. 1 which is identical to seal 4 in dimensions and shape (outer and inner distances $L_1$, $L_2$, $L_3$ and have also been denoted on seal 3 in FIG. 1). To enhance mating with one another, the respective male and female members of the respective seals 3 and 4 can be preferably chamfered as shown, e.g., in FIG. 9. More particularly, as shown in FIG. 9 the extension 57" and recess 58" of respective male and female seal members 7" and 8" of seal 4" are chamfered to snugly fit together. The amount of chamfer is preferably approximately $\frac{1}{8}$ in. on either side of extension 57" and recess 58". In other words, the distance $L_4$ at the base of extension 57" is preferably approximately $\frac{1}{4}$ in. greater than the distance $L_5$ at the tip of extension 57" in FIG. 9, resulting in a taper of about $\frac{1}{8}$ in. on either side of extension 57" from base to tip in FIG. 9. For example, distance $L_4$ can be about $\frac{1}{2}$ in. and distance $L_5$ about $\frac{1}{4}$ in., resulting in the $\frac{1}{8}$ in. taper. Similar dimensions are provided in recess 58" to snugly seat extension 57". For example, distance $L_6$ at the base of recess 58" in FIG. 9 can also be about $\frac{1}{4}$ in. to snugly receive extension 57". Longitudinal seals 17 and 18 are also arranged as shown in FIG. 1.

All parts are assembled as shown by the dash-dot lines in FIG. 1 with the following exception. Seals 3 and 4 are not coupled together until an article such as pipe 38 has been situated ill chamber 9 and upon one of the seal members 6 and 8 as illustrated in FIG. 2. In other words, the female seal members 6 and 8 are placed in respective seats 12 and 13 and then the article to be tested, e.g., pipe 38, is situated in member 2 in the direction of arrow A in FIG. 2 such that joint 39, i.e., the location along the pipe that is being examined for any leaks, is situated between seal members 6 and 8. Next, complementary seal members 5 and 7 are mated with seal members 6 and 8 about pipe 38, with member 1 then being pivoted closed and latched to member 2. The resulting closed and sealed chamber 9 is illustrated in FIG. 3 with pipe 38 protruding out of the ends 10 and 11 of the apparatus and joint 39 of pipe 38 being securely sealed with chamber 9.

The seals 3 and 4 are formed of suitable outer diameter $D_1$ for snugly seating in the apparatus and inner diameter $D_2$ for snugly receiving pipe of various nominal size and sealing tile interior of chamber 9. In particular, 2 inch, 4 inch, 6 inch and 8 inch nominal size pipe call be effectively tested with the invention apparatus. The dimensional standards of such nominal pipe size are well-known in the field of piping systems and are set forth, e.g., in Table 6-2 at pages 6–45 to 6–47 of *Perry's Chemical Engineers' Handbook, Fourth Edition*, McGraw Hill Book Company, New York (1963).

For example, interdigitated seals having inner diameters $D_2$ respectively of about $2\frac{1}{4}$, $4\frac{1}{4}$, $6\frac{3}{8}$ and $8\frac{3}{8}$ in. with ±about $\frac{1}{8}$ in. tolerances when fully interdigitated with one another (see seal 3 in FIG. 1) will effectively seat pipe of respective 2 inch, 4 inch, 6 inch and 8 inch nominal size while at the same time effectively sealing chamber 9. The outer diameter $D_1$ of such fully interdigitated seals is preferably about $1\frac{1}{2}$ to about 2 in. greater than respective inner diameter $D_2$, while longitudinal distances $L_1$ and $L_2$ are preferably about $1\frac{1}{2}$ to about 2 in. and about $\frac{1}{2}$ to about 1 in. respectively. The dimensions of seats 12 and 13 should be provided to snugly receive the respective seals of appropriate outer diameter $D_1$. In this regard, seals 3 and 4 can be manufactured to have the same outer diameter $D_1$ and different inner diameter $D_2$ to snugly receive the different nominal size pipes and, at the same time, all fit in a single apparatus formed by members 1 and 2.

Lateral seals 3 and 4 and longitudinal seals 17 and 18 are formed from any material suitable for effecting an adequate seal about chamber 9 when members 1 and 2 are closed and fastened together. For example, longitudinal seals 17 and 18 can be cut from lengths of Viton Rubber, a synthetic rubber composition available from E. I. Du Pont & Co., Wilmington, Del. Complementary seal members 5, 6, 7 and 8 of lateral seals 3 and 4 can be molded from silicone rubber material cast into suitable molds at elevated temperatures and then allowed to harden and cool. In this regard, the lateral seals 3 and 4 are preferably manufactured out of a blend of GE Silicone Rubber RTV 664A and RTV 664B compositions available from GE Silicone Products, Waterford, N.Y. (RTV denotes room temperature vulcanizing). RTV 664A is primarily composed of polydimethylsiloxane and quartz while RTV 664B is a vinylpolydimethylsiloxane composition. RTV 664A and RTV 664B are blended, poured into the respective mold and then cured at a temperature of about 100° F. for several hours (e.g., 1 to 8 hours) followed by cooling. These blended RTV compositions can be vulcanized at room temperature over a time of about 1 to 24 hours, however heating will shorten time required for final curing. Other suitable materials which can be used to mold seal members 3 and 4 include natural rubber, Buna S rubber, butyl rubber, nitrile rubber, neoprene rubber, hypalon rubber, EPDM or Viton rubber, all available from Mercer Rubber Co., Hauppauge, N.Y.

An example of a bench mounted system utilizing the apparatus of the present invention is shown in FIG. 3 where the apparatus can be connected to means for creating a pressure differential between the inner and outer circumferences of the pipe 38 and means for detecting any fluid leakage through the cross-section of the pipe 38 as shown in FIG. 3. More particularly, the T-joint 44 is coupled to member 1, e.g., threadingly screwed into port 37 as shown in FIG. 1. T-joint 44 is provided with a vacuum gauge, a suitable gauge being an Ashcroft gauge manufactured by Dresser Industries, Inc., Fairfield, N.J. and having a range of 0–30 in. Hg and accuracy of 0.1 in. Hg. Any conventionally available vacuum gauge such as a Bourdon gauge or a Heise gauge (manufactured by Dresser Industries) can be coupled to T-joint 44. At the same time, a vacuum pump 40 is coupled via a conduit 47 to the leg 55 of T-joint 44 in which shut-off valve 43 is situated. Leg 56 of T-joint 44 is coupled to a pressure transducer 45 which is in turn coupled through electronic circuitry 59 to a computer-based data acquisition system 41. Reference numeral 42 denotes a printer coupled to the data acquisition system by line 61, while reference numerals 46 and 60 denote appropriate coupling lines in the system shown in FIG. 3. This allows for provision of a digital readout for analyzing potential leaks in the pipe 38, in addition to the visual measurement indicated by gauge 36. The transducer 45 can be a low pressure vacuum transducer SenSym Model No. SCX15ANC manufactured by SenSym Inc., Sunnyvale, Calif., while the electronic circuitry can be obtained from Omega Engineering, Inc., Stamford, Conn. (part # PX142-015-ASV) and data acquisition system 41 can be an IBM compatible computer with National Instruments Lab Plus A/D Converter Data Acquisition Interface Board.

The system described supra is easily portable so that it can be conveniently carried to in a pipe installation site by personnel installing the pipe to test the pipe. For example, accurate measurements of fluid flow can be provided with just the Ashcroft vacuum gauge supra. Accordingly, leg 56 of T-joint 54 would be sealed off with a cap and only leg 55 coupled to a vacuum pump 40 or similar device. A suitable vacuum pump that is also portable and can be easily coupled to the invention apparatus for testing includes Mityvac Vacuum Pump, a hand pump manufactured by Neward Enterprises Inc., Rancho Cucamonga, Calif. The Mityvac Vacuum Pump can also be used to overpressurize chamber 9 so that fluid flow, i.e. any leak in pipe 38, would be detected by a pressure drop on the gauge 36. An inline pressure operated vacuum pump such as vacuum pump model No. JS 150M manufactured by Vaccon, Medfield, Mass. can also be used when coupled to a pressurized air supply.

An example of a system that is easily transportable for on-site field testing is shown in FIG. 7 where similar components to FIG. 1 are denoted with double prime (") symbols. The embodiment shown in FIG. 7 can be provided with locking eyebolts 66 and accompanying clamps 69 and pivot shafts 67 as described supra with respect to FIG. 8. In FIG. 7, two separate inlet ports 71 and 72 are provided through member 1" and into the interior chamber 9 as shown. A pressure measuring gauge 36", notably an Ashcroft vacuum gauge having a 1½ in. diameter face and backmount and also manufactured by Dresser Industries, is mounted in one 72 of these inlet ports as shown. A line 73 communicating with a pressure differential generating source, e.g., any of the portable vacuum pumps described supra, is mounted in the other 71 of these inlet ports, shut-off valve 43" also being positioned along this line 73. After suitable pressure or vacuum has been generated within the sealed interior chamber defined by members 1" and 2" with pipe 38 mounted as shown in FIG. 7, shut off valve 43" is closed and gauge 36" visually monitored to note any change in pressure which would denote fluid flow out from or into the interior sealed chamber and presence of a leak or fissure in the pipe 38. The system shown in FIG. 7 is easily transported and used by field personnel directly for testing at on-site locations where pipe is being installed.

The overall outer dimensions of the invention apparatus are not critical. For example, in a preferred embodiment members 1 and 2 can each be machined into substantially rectangular parallelepiped blocks each having rough dimensions of approximately 2.5 in. by 5.25 in. by 9 in. each, although any external shape can be utilized such as spheroidal, cylindrical, etc. An apparatus of such size can be easily carried with other equipment by personnel to the installation site where the pipe 38 can be conveniently tested for leakage just prior to or during installation. As noted supra, apparatus of such dimension is also very convenient for testing pipe of various nominal diameter, e.g., 2 inch, 4 inch, 6 inch, or 8 inch nominal diameter pipe. Pipe fabricated of any kind of material, e.g., metallic pipe, can be effectively tested for leaks with the invention apparatus. The present invention is especially well-suited for analyzing pipe formed of synthetic plastic material, e.g., material selected from the group consisting of polyethylene, polyvinyl chloride, acrylonitrite-butadiene-styrene, chlorinated poly (vinylchloride), polybutylene, polystyrene, polysulfone, poly (vinylidene fluorides), perfluoroalkoxy alkaline, polyacetal and mixtures thereof.

Figure 6:
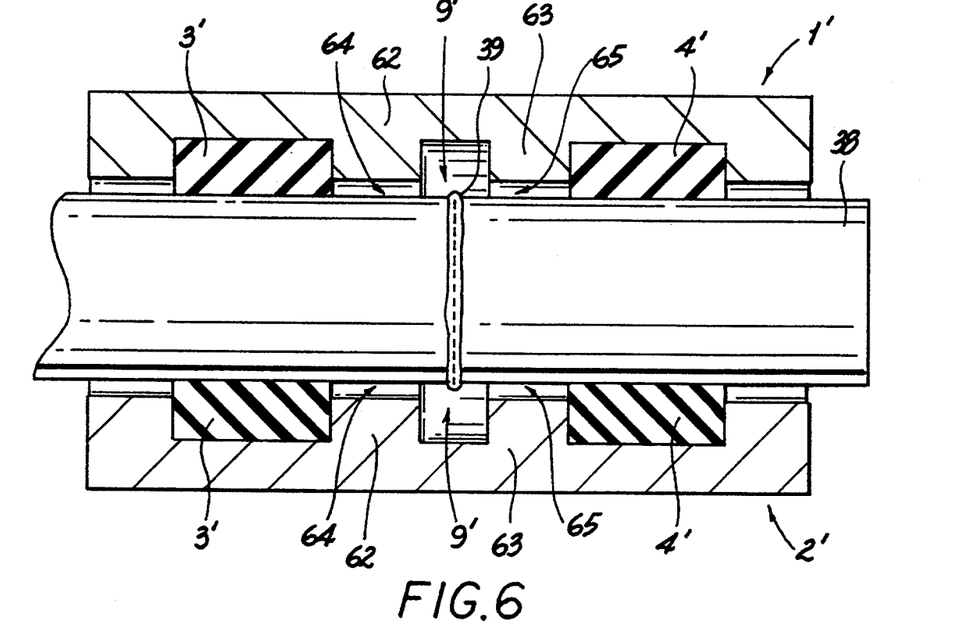
FIG. 6 is a front elevational view, partially in section, of an alternative embodiment of the apparatus of the present invention.

The inner dimensions of members 1 and 2, i.e., the shape of internal chamber 9, will control sensitivity of testing measurements carried out with the invention apparatus. Generally, the smaller the volume remaining in closed, sealed chamber 9 after the pipe 38 is situated therein, the more rapidly the pressure measurements that can be carried out. In this regard, FIG. 6 represents an elevational view partially in section of an alternative embodiment of the present invention. Similar elements to the embodiment illustrated in FIG. 1 are denoted by a prime (') symbol in FIG. 6. In the embodiment shown in FIG. 6, lands or steps 62 and 63 are provided on either side of interior chamber 9' adjacent respective seats for seals 3' and 4', with small clearances 64 and 65 being formed upon either side of chamber 9' proper when a pipe 38 of appropriate diameter is inserted into the invention apparatus as shown. The overall volume in chamber 9' proper of FIG. 6 is smaller than the volume of chamber 9 shown in FIG. 1. However, in other respects the embodiment shown in FIG. 6 operates in the exact same manner as the embodiment shown in FIG. 1.

Figure 5:
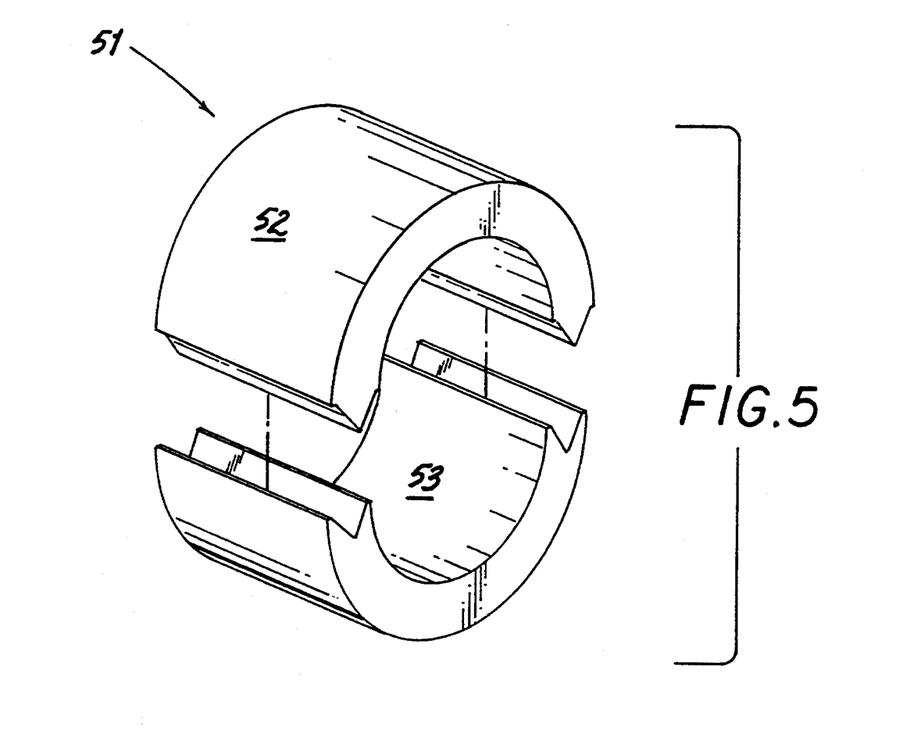
FIG. 5 is an exploded perspective view illustrating alternative sealing means for use in conjunction with the apparatus of the present invention.

FIG. 5 illustrates an alternative lateral seal 51 that can be incorporated into the invention apparatus. The seal 51 is composed of two complementary members 52 and 53 that are structured to form tongue and groove joints. As shown in FIG. 5, the tongue and groove joint is substantially in the shape of a V. In other respects, seal 51 functions in exactly the same manner as seals 3 and 4 shown in FIG. 1. In this regard, the various complementary members of seals 3, 4 and 51 can be tapered or chamfered along the edges to enhance mating with one another. The inner diameters of seals 3, 4 and 51 should be of sufficient dimensions to snugly receive pipe 38 of various nominal diameter or size as shown in the figures, e.g., FIGS. 3 and 6.

To effect a tighter seal against unwanted leakage from chamber 9, vacuum grease is sparingly applied on the exposed surfaces of seals 3, 4, 17 and 18, notably the inner surfaces of lateral seals 3 and 4 having inner diameter $D_2$. The preferred grease is High Vacuum Grease Silicone Lubricant manufactured by Dow-Corning of Midland, Mich. or Cello Grease TM (C-602) manufactured by Fisher Scientific of Fairlawn, N.J. The grease used should have a very low vapor pressure. Once pipe 38 has been received in chamber 9, seals 3 and 4 situated thereabout and members 1 and 2 pivoted closed and fastened to one another, the pipe 38 is ready to be tested for presence of any leaks along the portion thereof situated within chamber 9. The T-joint 44 with gauge 36 is threaded into port 37 and appropriately coupled to vacuum pump 40 and pressure sensitive transducer 45 as shown in FIG. 3.

Before carrying out the actual testing upon bead joint 39 of pipe 38, it is advisable to "calibrate" the apparatus of the present invention to account for any natural pressure drop that is not indicative of a leak within the pipe 38. More particularly, plastic material such as polyethylene which is used to form pipe possesses inherent porosity that normally allows a minute amount of fluid flowing through such pipe to escape through the walls thereof. Such fluid amount is minuscule and does not constitute a leak within the pipe. Nevertheless, flow of such fluid may be detected by the vacuum gauge 36 or computer-based data acquisition system 41. Furthermore, the silicone material used to form lateral seals 3 and 4 is itself slightly porous. Accordingly, tests should be run with undamaged plastic pipe to establish a performance standard of testing. After a suitable vacuum has been applied through port 37 by vacuum pump 40, shut off valve 43 is closed and gauge 36 is monitored to ascertain any pressure rise in chamber 9 about pipe 38. Computer-based data acquisition system 41 also monitors change in pressure. Alternatively, it is possible to pressurize the interior of chamber 9 through port 37 with a foot or hand-operated pump and then monitor fluid flow, if any, out through the open ends of pipe 38 protruding through ends 10 and 11 of the apparatus. Such monitoring could be effectively carried out with a pressure gauge or flow meter measurement device. Actual testing and calibration was carried out in this manner with the Ashcroft gauge and SenSym transducer coupled to the computer network elements as described supra and with a direct drive high vacuum pump (Model 810) manufactured by Marvac Scientific Manufacturing Company, Concord, Calif. as shown in FIG. 3.

A 2 in. nominal diameter undamaged polyethylene pipe 38 was placed in chamber 9 and secured therein as described supra. Chamber 9 was then evacuated with pump 40 to a pressure of less than about 0.05 psia at ambient room temperature (about 70° F.) and the shut off valve 43 then closed. Pressure rise within chamber 9 over time was then monitored by computer system 41 in conjunction with transducer 45 and the other elements described supra. A graph of the pressure rise in the cavity (chamber 9) over time is provided in FIG. 10. This pressure rise is indicative of fluid flow from the interior of pipe 38, i.e., the ambient surroundings, through the porous pipe wall and into chamber 9.

Figure 10:
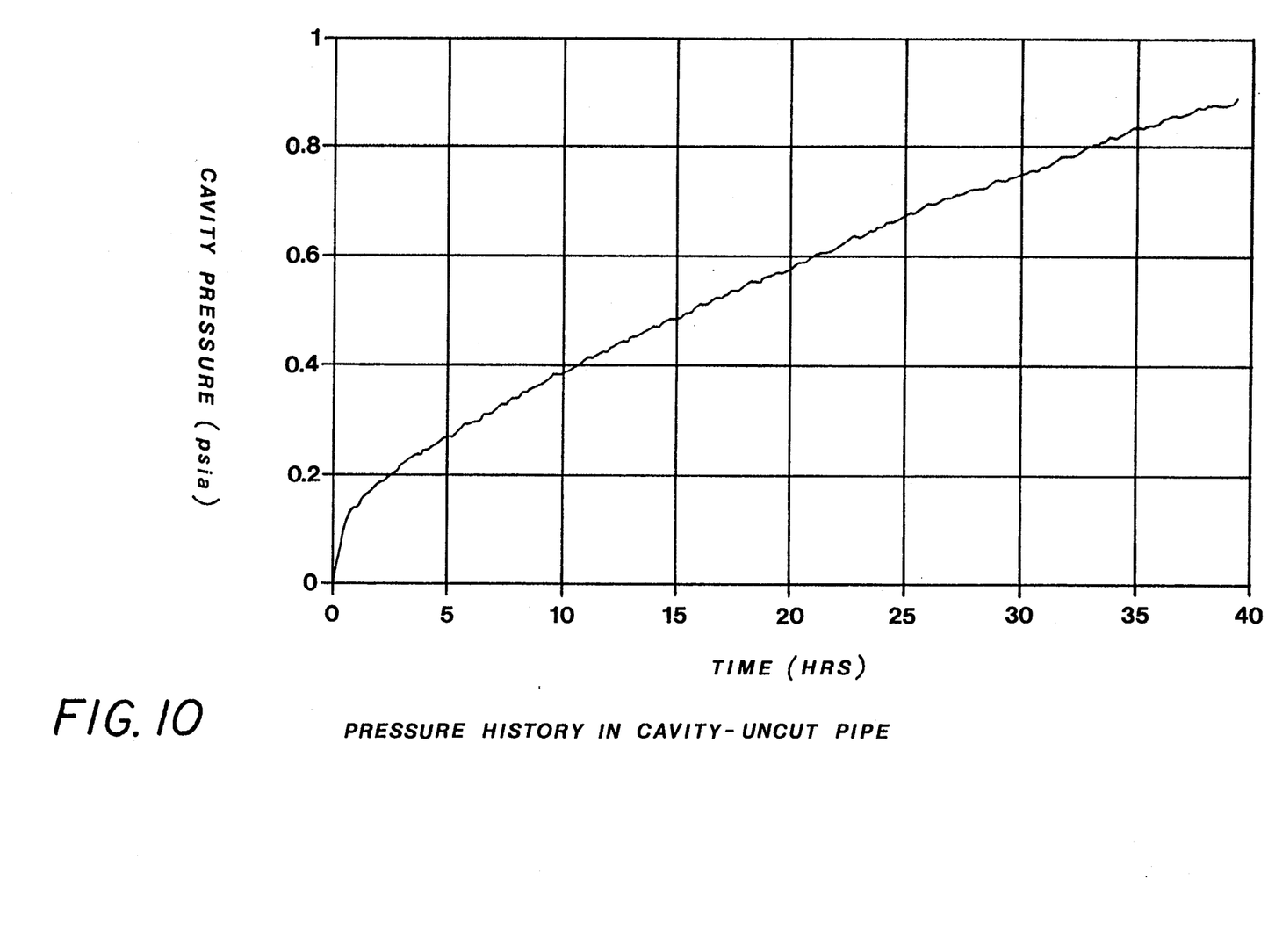
FIG. 10 is a graph illustrating cavity pressure history within the apparatus when an undamaged pipe is tested.

After an initial rise to approximately 0.28 psia in five hours, the pressure in the cavity began to rise at a substantially linear rate of about 0.04 in Hg per hour. This linear rise corresponds to a leak rate of approximately $5 \times 10^8$ SCFM (standard cubic foot per minute). After 40 hours, the cavity pressure read approximately 0.89 psia (compared to all outer atmospheric pressure of approximately 14.7 psia). Thus, the vacuum generated within chamber 9 remained substantially intact with virtually no leakage of fluid through the porous wall of pipe 38. Such leakage rates are well within tile accepted industry standards for utilization of such plastic pipe to carry natural gas such as methane.

Figure 11:
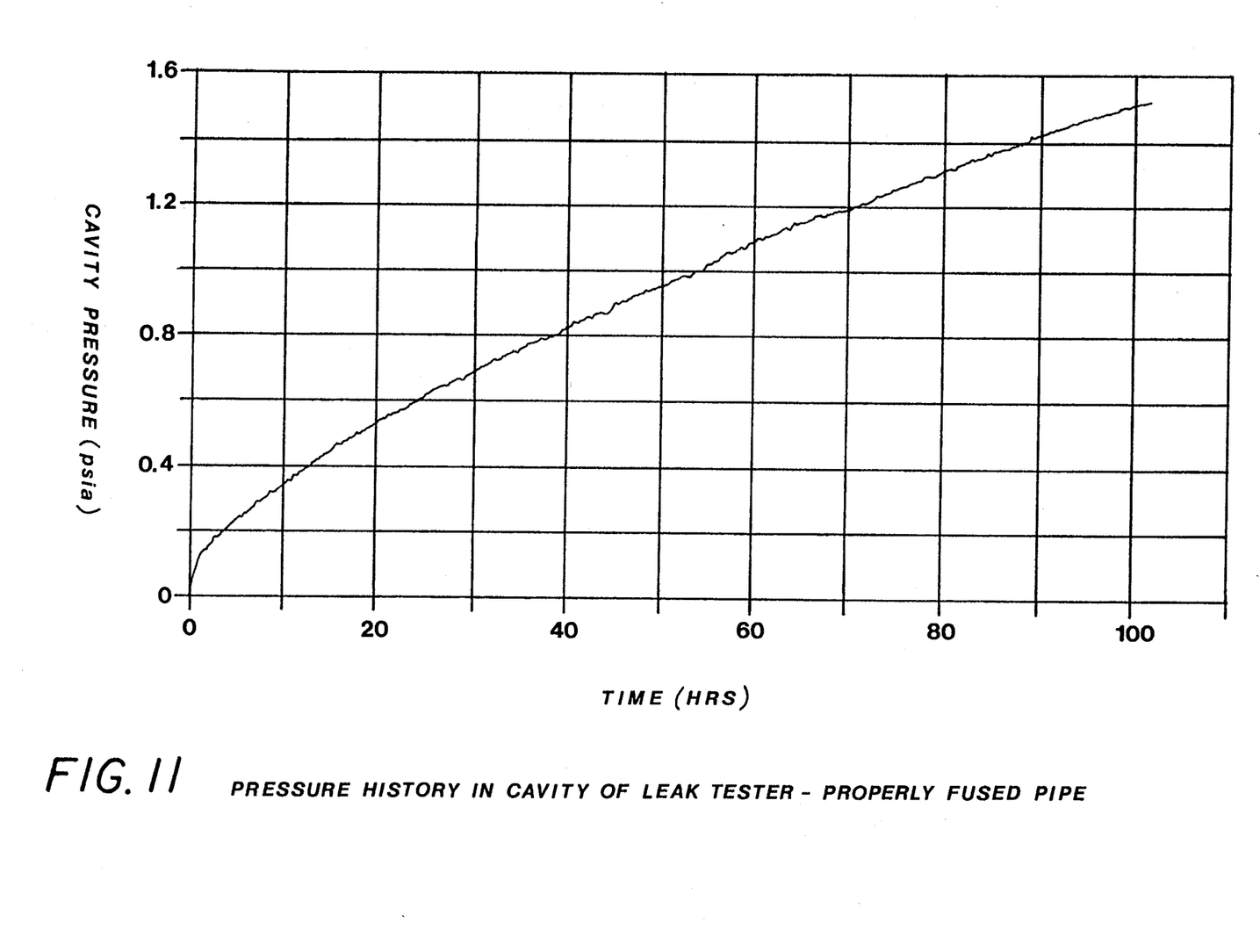
FIG. 11 is a graph similar to FIG. 10 illustrating cavity pressure history when testing a properly fused pipe.

Next, a section of pipe 38 which had been properly fused together, i.e., is formed from two separate pipe sections fused to form a bead joint 39, was placed within the invention apparatus and was sealed therein as described supra. A vacuum of 0.05 psia was applied at ambient temperature of 70° F. as described supra, with pressure rise in the chamber 9 cavity then being monitored in similar manner. The results of the monitoring are reported in FIG. 11 which is a graph of rise in cavity pressure over time. As documented therein, cavity pressure initially rose to a level of about 0.2 psia in four hours and then linearly rose at a rate of approximately 0.03 in. Hg per hour to a level of approximately 1.50 psia in 100 hours as opposed to an outer ambient pressure of approximately 14.7 psia. This translates to a leak rate of approximately $4 \times 10^{-8}$ SCFM, well within the accepted industry standard (Soap Bubble Test, a standard industry technique) for utilizing such joined pipe to carrying natural gas. Furthermore, the evidence presented in FIGS. 10 and 11 clearly documents that the apparatus of the present invention maintains a vacuum generated therein about a hollow member such as a pipe communicating with ambient surroundings over a considerable period of time (i.e., 40 to 100 hours).

Figure 12:
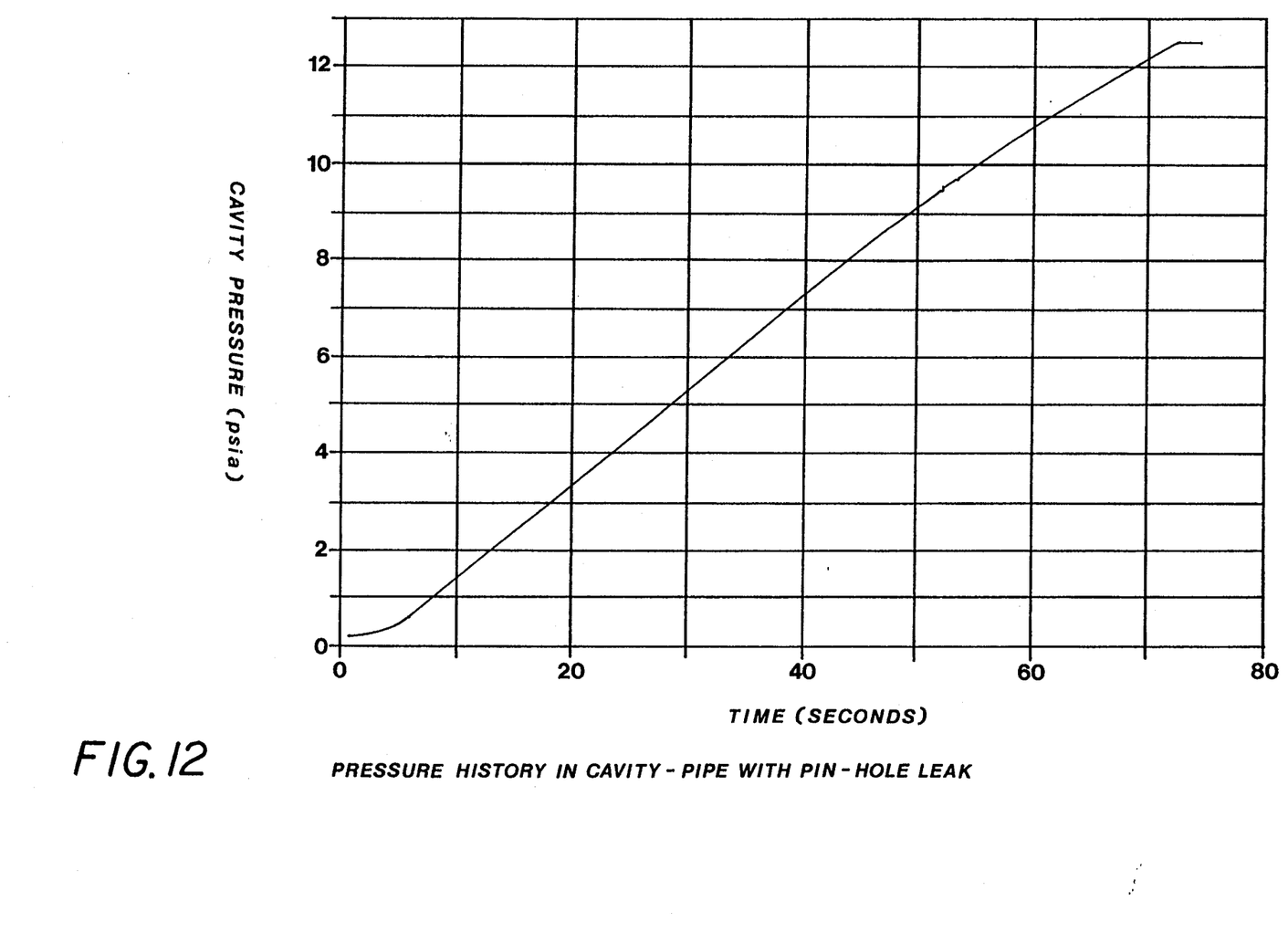
FIG. 12 is a graph illustrating cavity pressure history when testing damaged pipe having a pin-hole leak.

The invention apparatus was then used to analyze leakage through a pipe joint that was explicitly provided with a pin-hole leak. More particularly, the pinhole was produced by introducing a 0.010 inch diameter wire between two sections of polyethylene 2-inch nominal diameter pipe 38 which were then butt-fused together to form bead 39. The wire was withdrawn after the fusion process was completed. The resulting pinhole was measured and found to have a diameter of approximately 5 mils (0.005 inch). This "damaged" section of pipe was then placed within the invention apparatus which was sealed and evacuated as described supra to a pressure of about 0.05 psia (at ambient conditions), the pressure rise then being monitored. The results of this monitoring are presented as a graph of cavity pressure rise over time (seconds) shown in FIG. 12. As can be seen from this graph, cavity pressure within chamber 9 quickly rose to a level of 12.5 psia in a little over 72 seconds. This sharp rise in pressure over such an extremely short interval (a little over a minute), indicates the presence of a minute leak in the pipe section which renders such pipe both unsafe and inoperable for effectively transporting fluid such as natural gas.

Figure 13:
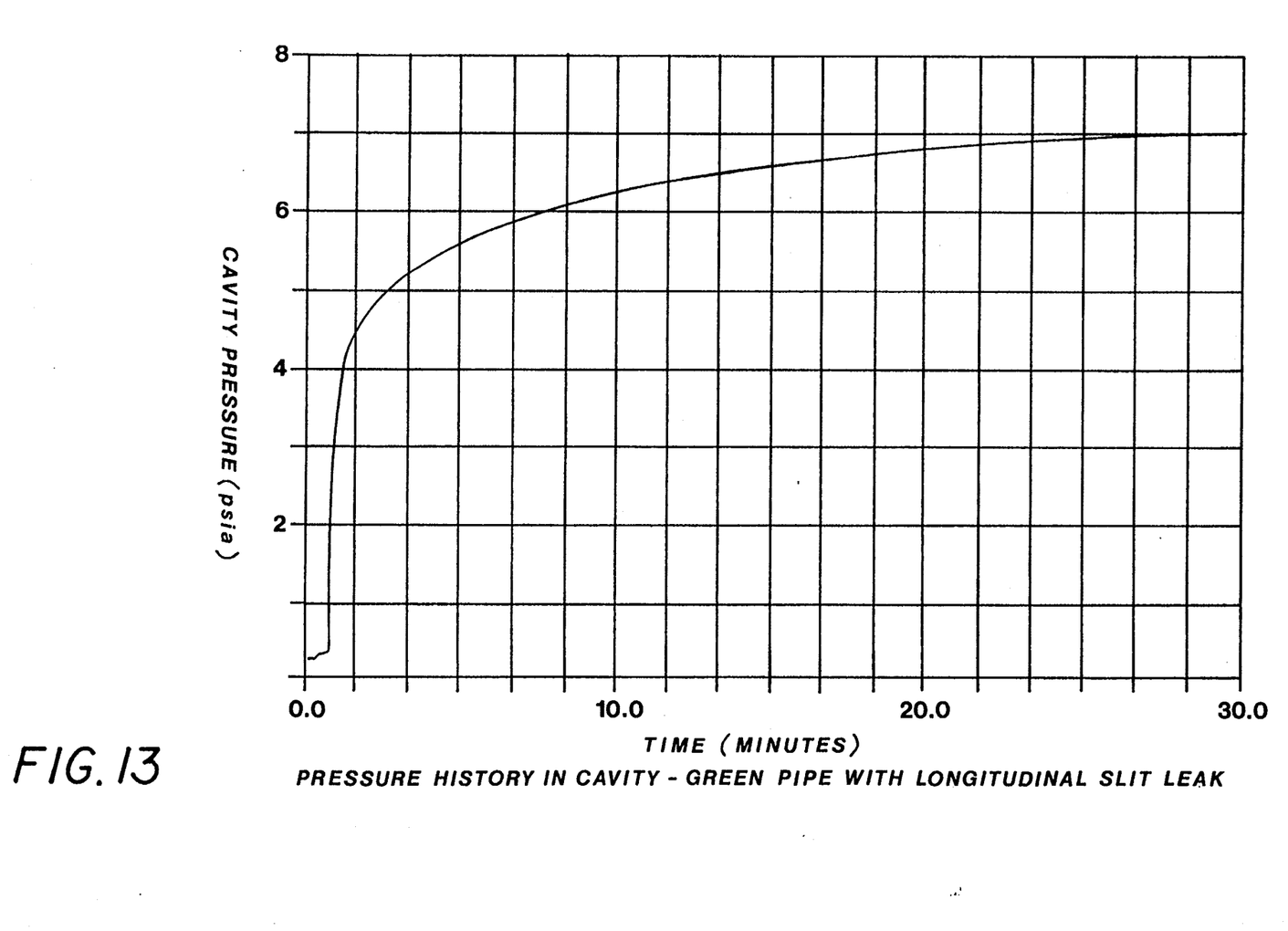
FIG. 13 is a graph illustrating cavity pressure history when testing damaged pipe having a longitudinal slit therethrough.

A section of 2 in. nominal diameter polyethylene pipe that had been in service and sustained a longitudinal slit of approximately one quarter inch length was recovered and tested in the apparatus of the present invention in the same manner as described supra. The results are reported in the graph shown in FIG. 13. As shown therein, cavity pressure rose to approximately 4.3 psia in 100 seconds and eventually leveled off to about 7 psia in one half hour. This sharp pressure rise over a relatively short period of time (minutes or seconds) indicated presence of a leak in the recovered pipe section, warranting its removal from service.

Performance of the invention apparatus under different conditions of outside temperature was also examined to test leak-tightness of seals 3 and 4. Undamaged, uncut pipe which was analyzed as reported in FIG. 10 supra was again placed and sealed within the invention apparatus which was then evacuated in the preceding manner, at different outside temperatures of 40° F., 70° F. and 100° F., simulating various cold and hot ambient conditions at which the pipe is normally tested. The results are reported in FIG. 14. The pressure history in the cavity of the apparatus tinder cold conditions shown in FIG. 14 (plot B) indicates that the pressure reached about 2.3 psia in 60 hours. By comparison, the pressure reached 1.45 psia at room temperature (70° F.) in the same time period (plot A). Apparently, the cold ambient condition caused the seals 3 and 4 to slightly shrink and harden, in turn causing a slight pressure loss. However, this pressure loss is extremely minor and does not adversely affect performance of the apparatus.

Figure 14:
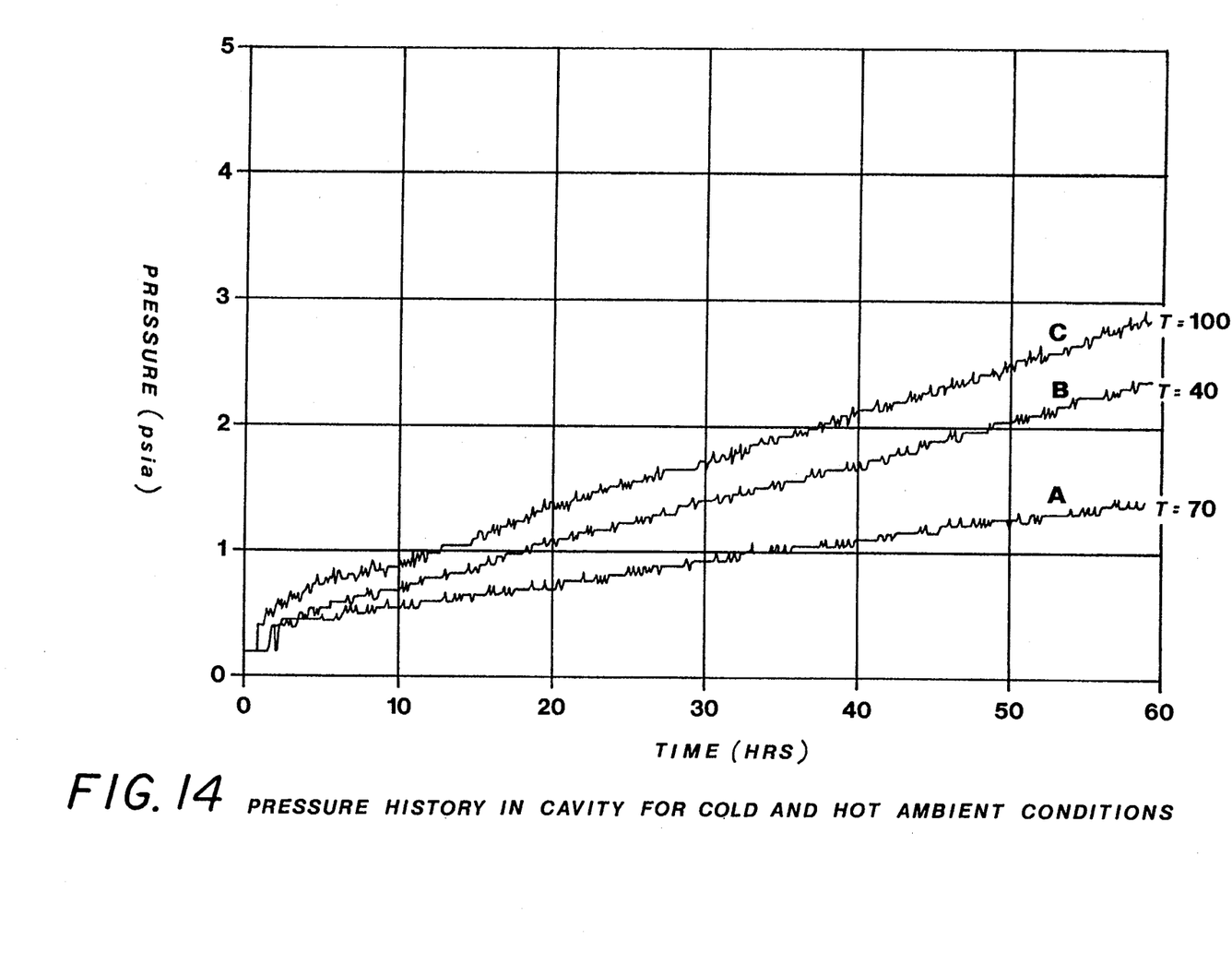
FIG. 14 is a graph illustrating cavity pressure history when testing the undamaged pipe as in FIG. 10 under different conditions of ambient temperature.

When testing was carried out under relatively hot ambient conditions (100° F. temperature, 80% relative humidity), cavity pressure reached 2.8 psia in 60 hours (plot C), about twice the rise under room conditions (plot A). Apparently, the higher temperature caused some thermal expansion of the material used to form seals 3 and 4 in addition to expansion of the uncut polyethylene pipe itself, thus allowing more air to infiltrate the interior of the vacuumized chamber. Nevertheless this rate is also very small and clearly acceptable for operability of the apparatus.

Accordingly, the results presented in FIGS. 10-14 document that the apparatus of the present invention can be used to accurately test for fluid leaks in an article such as a pipe within a short period of time. The invention apparatus is easily transported and requires a minimal amount of separate components, thus facilitating its use by appropriate personnel. In this regard, the invention apparatus is especially suited for use by personnel installing pipe for fluid conduction. The apparatus can be used by such personnel right at the site where the pipe is being installed to test the integrity of the pipe, notably the resistance of joints formed between pipe sections to fluid penetration therethrough. It is fairly economical to construct and use the apparatus, thus saving considerable expense, time and effort in testing of appropriate pipe. Conservation of material is enhanced because, among other factors, it is no longer necessary to evacuate or direct fluid through an interior channel of a pipe to ascertain presence of any leaks out through the pipe.

The preceding features of the present invention are merely exemplary and are not intended to limit the scope thereof in any way. Other embodiments thereof can be practiced within the spirit of the invention set forth supra.

What is claimed is:

1. Apparatus for detecting fluid flow across an article, comprising:

means defining a chamber for receiving the article therein, and means for sealing said chamber from ambient surroundings such that at least a portion of the article protrudes into the ambient surroundings, said sealing means comprising at least two complementary seal members, each seal member being structured and arranged to interdigitate with one another about the article circumference at each end of said chamber when the article is situated within said chamber, whereby said interdigitated complementary seal members mate together along an arc segment external to the article circumference and fluid flow through the article between the ambient surroundings and said chamber can be detected.

2. Apparatus of claim 1 further comprising:

means for generating a pressure differential across the article when the article is situated within said chamber and said chamber is sealed from the ambient surroundings.

3. Apparatus of claim 2 wherein said pressure differential generating means comprise means for generating a vacuum within said chamber interior.

4. Apparatus of claim 2 wherein said pressure differential generating means comprise means for pressurizing said chamber relative to the ambient surroundings.

5. Apparatus of claim 1 wherein said defining means comprise two separate members arranged to be coupled together and each being contoured to define said chamber therebetween when coupled together such that at least one portion of said chamber communicates with the ambient surroundings, and said sealing means are structured and arranged to seal an interior portion of said chamber at said communicating portion when the article is situated therewithin.

6. Apparatus of claim 5 wherein said two separate members define said chamber such that two opposite portions of said chamber communicate with the ambient surroundings when said members are coupled together, and said sealing means comprises at least two separate seals, each said seal comprising two of said seal members and being structured and arranged to seal off said chamber interior at a respective one of said chamber portions communicating with the ambient surroundings such that the article situated within said chamber interior protrudes into the ambient surroundings through both said communicating portions of said chamber.

7. Apparatus for detecting fluid flow across an article, comprising:

means defining a chamber for receiving the article therein, and means for sealing said chamber for ambient surroundings such that at least a portion of the article protrudes into the ambient surroundings,
wherein said defining means comprise
two separate members arranged to be coupled together and each being contoured to define said chamber therebetween when coupled together such that at least one portion of said chamber communicates with the ambient surroundings, and
said sealing means are structured and arranged to seal an interior portion of said chamber at said communicating portion when the article is situated therewithin,
said two separate members define said chamber such that two opposite portions of said chamber communicate with the ambient surroundings when said members are coupled together, and
said sealing means comprises at least two separate seals, each said seal comprising two seal members and being structured and arranged to seal off said chamber interior at a respective one of said chamber portions communicating with the ambient surroundings such that the article situated within said chamber interior protrudes into the ambient surroundings through both said communicating portions of said chamber,
wherein at least one of said seals comprises two of said separate seal members which are structured and arranged to interdigitate with one another when situated in said respective chamber portion,
whereby fluid flow through the article between the ambient surroundings and said chamber can be detected.

8. Apparatus of claim 5 wherein said chamber defining members are articulated with respect to one another such that said members are movable with respect to one another between open and closed positions, and
said sealing means additionally comprise means for fastening said defining members together when situated in said closed position.

9. Apparatus of claim 2 further comprising
means for detecting fluid flow in said chamber, wherein detection of fluid flow is indicative of a leak through the article.

10. Method for detecting fluid flow through an article, comprising the steps of
placing the article within the test apparatus chamber,
sealing an interior of said chamber from ambient surroundings such that at least a portion of the article protrudes into the ambient surroundings by interdigitating two complementary seal members at each end of said chamber about the article circumference, whereby said interdigitated complementary seal members mate together along an arc segment external to the article circumference,
generating a pressure differential across the article when the article is situated within the sealed chamber, and
monitoring pressure drop through the article between the ambient surroundings and said chamber interior to detect fluid flow,
whereby detection of fluid flow is indicative of a leak or fissure in the article.

11. Method of claim 10 comprising the additional step of
providing a housing having two separate members coupled together to define said chamber in which the article is placed so that two opposite portions of said chamber communicate with the ambient surroundings, and
wherein said chamber interior is sealed by situating a seal at each of said opposite chamber portions so that the article situated within said chamber interior protrudes into the ambient surroundings through both seals when said members are closed together, each said seal comprising said two complementary seal members.

12. Method of claim 10 wherein the article is a pipe which is placed within said chamber so that a joint formed between two pipe sections is situated with said chamber,
whereby detection of any fluid flow is indicative of a leak across the pipe joint.

13. Method of claim 10 wherein the pressure differential is generated across the article by generating a vacuum within said sealed chamber interior.

14. System for detecting a leak or fissure in a pipe, comprising the combination of
a pipe situated within a sealed chamber and protruding through opposite ends of said sealed chamber into ambient surroundings,
means for generating a vacuum within said sealed chamber with respect to the ambient surroundings,
means for detecting any fluid flow into or out of said sealed chamber, and
at least two complementary seal members interdigitating with one another about the pipe circumference at each end of said chamber,
whereby said interditigated complementary seal members mate together along an arc segment external to the pipe circumference and detection of fluid flow is indicative of a leak or fissure in the pipe.

15. System of claim 14 wherein said pipe is situated within said chamber such that a joint formed between said two pipe sections is situated within said chamber,
whereby detection of fluid flow is indicative of a leak across said pipe joint.

16. System of claim 15 wherein said pipe is formed of plastic material.

17. System of claim 16 wherein said plastic material is selected from the group consisting of polyethylene, polyvinyl chloride, acrylonitrile-butadiene-styrene, chlorinated poly(vinyl chloride), polybutylene, polystyrene, polysulfone, poly (vinylidene fluoride), perfluoroalkoxy alkaline, polyacetal and mixtures thereof.

18. Method for detecting fluid flow through an article, comprising the steps of
placing the article within a test apparatus chamber,
sealing an interior of said chamber from ambient surroundings such that at least a portion of the article protrudes into the ambient surroundings by interdigitating two complementary seal members at each end of said chamber around the article circumference, whereby said interdigitated complementary seal members mate together along an arc segment external to the article circumference,
generating a vacuum within the sealed chamber interior, and
monitoring pressure drop through the article between the ambient surroundings and said chamber interior to detect fluid flow,
whereby detection of fluid flow is indicative of a leak or fissure in the article.

19. Apparatus of claim 5 wherein said two separate members defining said chamber are fabricated from clear plastic material.

20. Apparatus of claim 7 wherein said two separate seal members are provided with complementary male and female members, said male member having an inwardly stepped extension and said female member having an inner recess dimensioned to snugly receive said inwardly stepped extension of said male member when said male and female seal members are brought together.

21. Apparatus of claim 20 wherein said stepped extension and inner recess of said respective male and female members are chamfered.

* * * * *